United States Patent [19]

Mattar et al.

[11] Patent Number: 4,891,991
[45] Date of Patent: Jan. 9, 1990

[54] CORIOLIS-TYPE MASS FLOWMETER

[75] Inventors: Wade M. Mattar, Wrentham; Duane T. Thompson, Franklin; Joseph P. DeCarlo, Wrentham, all of Mass.; Yousif Hussain, Walton on Thames, United Kingdom; Gordon W. Chitty, Norfolk, Mass.

[73] Assignee: The Foxboro Company, Foxboro, Mass.

[21] Appl. No.: 923,847

[22] Filed: Oct. 28, 1986

[51] Int. Cl.⁴ .............................................. G01F 1/84
[52] U.S. Cl. ................................................ 73/861.38
[58] Field of Search ......................... 73/861.37, 861.38

[56] References Cited

U.S. PATENT DOCUMENTS

| | | | |
|---|---|---|---|
| Re. 31,450 | 11/1983 | Smith | 73/861.38 |
| 3,108,475 | 10/1963 | Henderson | 73/194 |
| 3,276,257 | 10/1966 | Roth | 73/861.30 |
| 3,355,944 | 12/1967 | Sipin | 73/861.38 |
| 3,485,098 | 12/1969 | Sipin | 73/194 |
| 3,927,565 | 12/1975 | Pavlin et al. | 73/194 M |
| 4,127,028 | 11/1978 | Cox et al. | 73/194 B |
| 4,187,721 | 2/1980 | Smith | 73/861.38 |
| 4,192,184 | 3/1980 | Cox et al. | 73/194 B |
| 4,252,028 | 2/1981 | Smith | 75/861.38 |
| 4,422,338 | 12/1983 | Smith | 73/861.38 |
| 4,444,059 | 4/1984 | Smith | 73/816.37 |
| 4,491,009 | 1/1985 | Ruesch | 73/32 A |
| 4,491,025 | 1/1985 | Smith et al. | 73/861.38 |
| 4,559,833 | 12/1985 | Sipin | 73/861.38 |
| 4,622,858 | 11/1986 | Mizerak | 73/816.38 |

(List continued on next page.)

FOREIGN PATENT DOCUMENTS

| | | |
|---|---|---|
| 0037654 | 10/1981 | European Pat. Off. |
| 0210308 | 2/1987 | European Pat. Off. |
| 0212782 | 3/1987 | European Pat. Off. |
| 56-125622 | 10/1981 | Japan |
| WO8505677 | 12/1985 | PCT Int'l Appl. |
| WO8600699 | 1/1986 | PCT Int'l Appl. |
| WO8702469 | 4/1987 | PCT Int'l Appl. |

OTHER PUBLICATIONS

Wildhacrl "Review of Some Methods of Flow Measurement" in Science 8/54.
G. P. Katys, "Systems for Mass Flow" in Continuous Measurement of Unsteady Flow, MacMillan Co., (1964), pp. 45–53.
Product literature, K-Flow, "Mass Flow Meters", Oct. 27, 1986, with letter dated Nov. 25, 1986, from K—Flow's general sales manager.
Undated product literature, Bopp & Reuter, "Massedurchflubmesser System RHEONIK" with translation.
Article, K. O. Plache, "Coriolis/Gyroscopic Flow Meter", Nov. 1977, pp. 1–7.
M. M. Decker, "The Gyroscopic Mass Flowmeter", The engineers' Digest, Jul., 1960, vol. 21, No. 7, pp. 92–93.

Primary Examiner—Herbert Goldstein
Attorney, Agent, or Firm—Fish & Richardson

[57] ABSTRACT

A rigid central manifold block defines a coaxial inlet and outlet of the flowmeter and supports at least one continuous conduit loop substantially encircling the block and having its inlet and outlet ends closely spaced and rigidly connected to the block. Preferably, the loop includes a straight section perpendicular to the inlet and outlet ends. Dual drive means are preferably provided for oscillating the straight section back and forth about its perpendicular bisector and complementary position detectors employed at or near the opposite ends of the straight section, preferably at the same location as the drive units, provide readouts which are combined algebraically and synchronously demodulated to yield a Coriolis-related output indicative of mass flow. Preferably, a second loop, identical and parallel to the first, is supported by the same block. The block is channeled to serve as a manifold and interchangeable manifolds are disclosed for series and parallel flow through the two loops, respectively. The plane of the loop or loops can be oriented perpendicular or parallel (in line) to the process line.

38 Claims, 7 Drawing Sheets

U.S. PATENT DOCUMENTS

| | | | |
|---|---|---|---|
| 4,628,744 | 12/1986 | Lew | 73/861.38 |
| 4,655,089 | 4/1987 | Kappelt et al. | 73/861.38 |
| 4,658,657 | 4/1987 | Kuppers | 73/861.38 |
| 4,680,974 | 7/1987 | Simonsen et al. | 73/861.38 |
| 4,703,660 | 11/1987 | Brenneman | 73/861.38 |
| 4,716,771 | 1/1988 | Kane | 73/861.38 |
| 4,733,569 | 3/1988 | Kelsey et al. | 73/861.38 |
| 4,747,312 | 5/1988 | Herzl | 73/861.38 |
| 4,756,197 | 7/1988 | Herzl | 73/861.38 |
| 4,756,198 | 7/1988 | Levien | 73/861.38 |
| 4,759,223 | 7/1988 | Frost | 73/861.38 |
| 4,763,530 | 8/1988 | Mizerak | 73/861.38 |
| 4,768,385 | 9/1988 | Cage | 73/816.38 |
| 4,781,069 | 11/1988 | Mitzner | 73/861.38 |
| 4,782,711 | 11/1988 | Pratt | 73/861.38 |
| 4,784,000 | 11/1988 | Gaertner | 73/861.12 |
| 4,784,001 | 11/1988 | Gaertner | 73/861.12 |
| 4,793,192 | 12/1988 | Jerger et al. | 73/861.12 |
| 4,798,091 | 1/1989 | Lew | 73/861.38 |
| 4,817,448 | 4/1989 | Hargarten et al. | 73/861.38 |
| 4,823,613 | 4/1989 | Cage et al. | 73/861.38 |
| 4,823,614 | 4/1989 | Dahlin | 73/861.38 |

FIG. 2A
(SERIES FLOW)

FIG. 11A
PERPENDICULAR

FIG. 11B
IN-LINE

CORIOLIS-TYPE MASS FLOWMETER

BACKGROUND OF THE INVENTION

The present invention relates generally to Coriolis-type mass flowmeters and in particular to mass flowmeters employing oscillating conduits.

In response to the need to measure the quantity of material being delivered through pipelines, numerous types of flowmeters have evolved from a variety of design principles. One of the more widely used types of flowmeters is based on volumetric flow. Some designs employ turbines in the flow line; others operate on a resilient vane principle. Of course, volumetric flowmeters are at best inaccurate in determining the quantity of material delivered, where the density of the material varies with temperature or feedstock or where the fluid being pumped through the pipe line is polyphase such as a slurry or where the fluid is non-Newtonian such as mayonnaise and other food products. In the petroleum field, so called "custody transfer" requires accurate measurement of the exact amount of oil or gasoline being transferred through the pipeline. The higher the price of oil, the more costly the inaccuracy of the flow measurement. In addition, chemical reactions, which are in effect mass reactions where proportions are critical, may be poorly served by volumetric flowmeters.

These problems are supposed to be solved by mass flowmeters which provide a much more direct indication of the quantity of material—down theoretically to the molecular level—which is being transferred through the pipeline. Measurement of mass in a moving stream requires applying a force to the stream and detecting and measuring some consequence of the resulting acceleration.

The present invention is concerned with improvements in one type of direct mass measuring flowmeter referred to in the art as a Coriolis effect flowmeter. Coriolis forces are exhibited in the radial movement of mass on a rotating surface. Imagine a planar surface rotating at constant angular velocity about an axis perpendicularly intersecting the surface. A mass travelling at what appears to be a constant linear speed radially outward on the surface actually speeds up in the tangential direction. The change in velocity implies that the mass has been accelerated. The acceleration of the mass generates a reaction force in the plane of rotation perpendicular to the instantaneous radial movement of the mass. In vector terminology, the Coriolis force vector is the cross-product of the angular velocity vector (parallel to the rotational axis) and the velocity vector of the mass in the direction of its travel with respect to the axis of rotation (e.g., radial). Consider the mass as a person walking on a turntable and the reaction force will be manifested as a listing of the individual to one side to compensate for acceleration.

The applicability of the Coriolis effect to mass flow measurement was recognized long ago. If a pipe is rotated about a pivot axis orthogonal to the pipe, the material flowing through the pipe is a radially travelling mass which, therefore, experiences acceleration. The Coriolis reaction force shows up as a deflection or offset of the pipe in the direction of the Coriolis force vector in the plane of rotation.

Mass flowmeters in the prior art which induce a Coriolis force by rotation fall into two categories: continuously rotating and oscillating. The principal functional difference between these two types is that the oscillating version, unlike the continuously rotating one, has periodically (i.e., usually sinusoidally) varying angular velocity producing, as a result, a continuously varying level of Coriolis force. In addition, a major difficulty in oscillatory systems is that the effect of the Coriolis force is relatively small compared not only to the drive force but also to extraneous vibrations. On the other hand, an oscillatory system can employ the bending resiliency of the pipe itself as a hinge or pivot point for oscillation and thus obviate separate rotary or flexible joints.

Some of the remaining problems with prior art Coriolis effect mass flowmeters are that they are too sensitive to extraneous vibration, require precise balancing of the conduit sections undergoing oscillation, consume too much axial length on the pipeline and produce undue stress and resulting fatigue in the conduit at the flexure point or fail to provide adequate mechanical ground at the flexure point of the oscillating conduit.

SUMMARY OF THE INVENTION

The general purpose of the invention is to improve the performance of Coriolis-type mass flowmeters by optimizing the overall design of the flowmeter. A more specific goal is to eliminate or lessen some of the shortcomings of prior art mass flowmeters to make them more reliable, more compact and less susceptible to interference from extraneous loads and, of course, more accurate, without unduly increasing the complexity or manufacturing cost of the meter.

These and other objects of the invention are achieved by various combinations of features disclosed herein. The claims appended hereto should be consulted for the scope of the invention. A rigid central block supports at least one loop of tubing connected via the block to an inlet and outlet of the meter. The inlet and outlet ends of the loop itself are preferably connected to the block by respective straight parallel conduit legs closely spaced to each other and rigidly connected to the block at their proximal ends. The loop includes a straight section preferably perpendicular to the inlet and outlet legs. However, in the generalized case the parallel inlet/outlet legs ought to be substantially perpendicular to the orthogonal projection of the straight section onto the plane defined by the legs. The respective ends of the straight section are connected to the inlet and outlet by means of side sections or lobes. In one embodiment, the side sections are sloping and straight, forming an overall configuration like a coat hanger except for the parallel inlet/outlet legs. Drive means are provided for oscillating the straight section back and forth about its perpendicular bisector, preferably an axis of symmetry for the loop. Complementary position detectors employed at or near the opposite ends of the straight section provide readouts which are combined algebraically to yield a Coriolis-related term.

In another aspect of the invention, complementary dual drive units are located at opposite ends of the straight section and impart to it oscillatory motion about the perpendicular bisector axis. The intermediate portion of the straight section is thus left free. In the preferred embodiment, corresponding drive units and position detectors are located at approximately the same point along the loop to drive and detect the same type of motion.

In the preferred embodiment and as another aspect of the invention, a second loop parallel to the first is supported by the same block. The second loop is preferably identical to the first and lies in a closely spaced parallel plane. The block is channeled to serve as a manifold and coupled to the process line. Incoming fluid enters an intake manifold ported through the block to at least one of the inlet ends of the two loops. At least one of the outlet ends of the loops is ported through the block to an outlet manifold which is reconnected into the pipeline. The block thus serves not only as mechanical ground for each of the loops but also as a manifold. However, the block can be channeled for series or parallel flow. The flow direction in the loops is preferably the same.

In the preferred embodiment, the loops are driven 180° out of phase. Given a center line parallel to both straight sections and midway between them, corresponding ends of the two straight sections of the loops move toward the center line or away from the center line together. The motion of each loop is absorbed as torsional deflection in the straight parallel legs connecting the loops respectively to the manifold block. Together, the two loops and the manifold block form a tuning fork assembly. The motion of the two loops tends to cancel out at the block and the inertia of the block tends to isolate the loops from extraneous vibration. Further isolation can be accomplished by welding the tubes to an isolation plate displaced from the manifold.

The plane of the loop or loops can be oriented perpendicular or parallel (in-line) to the process line. In the perpendicular orientation, the driver and detector assemblies at the ends of the straight sections are preferably supported on the ends of opposed arms cantilevered from the manifold block. The axial length of the meter in the direction of the process line can be made very small, on the order of one foot for a one inch tube. With the other orientation, for example, where the plane of each loop is parallel to the process line, the drive/detector assemblies can be supported by similar cantilevered arms over the process line. While the in-line configuration may reduce the meter's susceptibility to vibration in certain cases, the trade-off is an increase in the axial length of the meter.

DESCRIPTION OF THE PREFERRED EMBODIMENTS

A specific tubular configuration is described herein in two orientations, perpendicular and in-line with respect to the direction of the process flow, i.e., the direction of flow in a straight section of pipeline in which the meter is to be inserted. The implementations illustrated herein are designed for one inch pipelines for a variety of products including petroleum based fuels, for example. The invention, of course, is applicable to a wide variety of other specific designs for the same or different applications.

Figure 1:
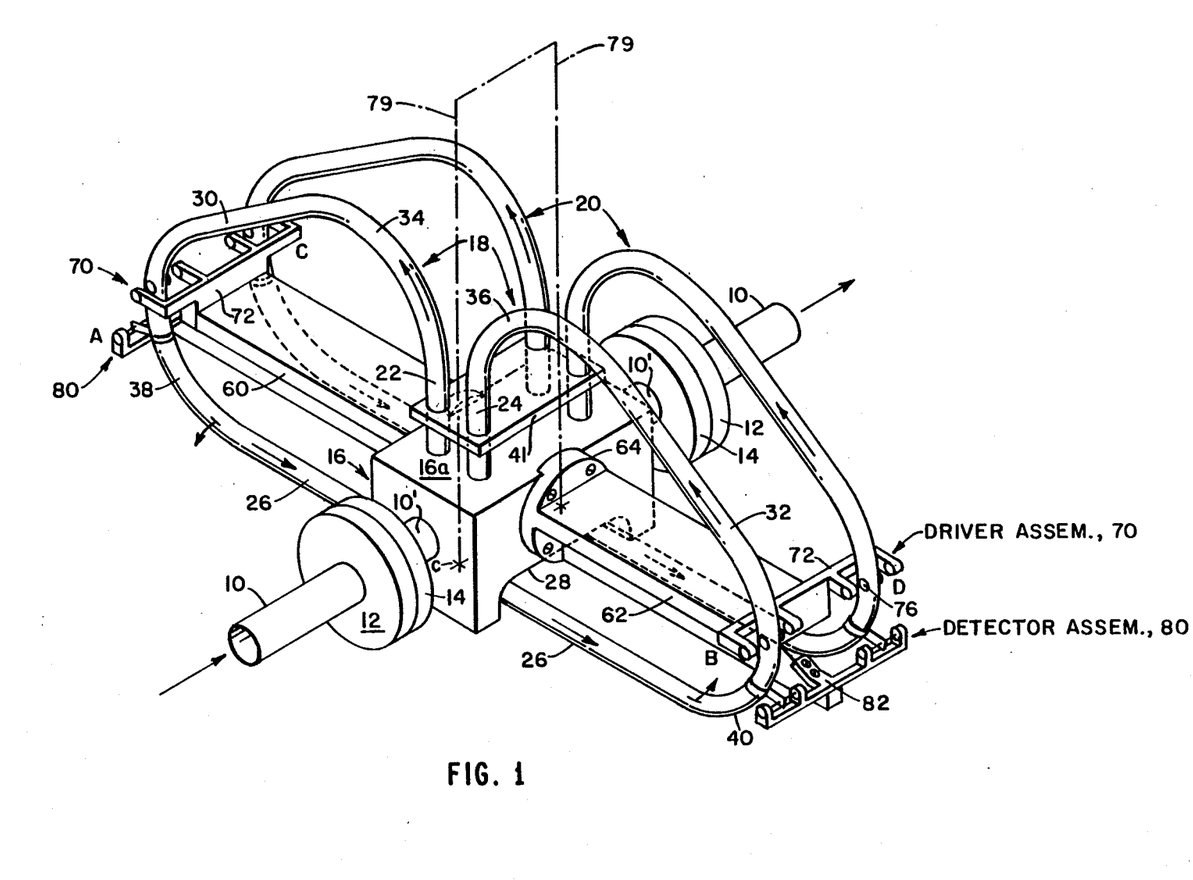
FIG. 1 is an oblique isometric view of a double loop, dual drive, central manifold, Coriolis effect mass flowmeter according to the invention.

FIG. 1 illustrates a double loop, dual drive/detector system with torsional loading of the tube ends where they are connected to a single rigid central manifold connected in line with the process flow. The same embodiment is shown in FIGS. 1, 2 and 3–6 with more detail being provided in FIGS. 4–6.

The mass flowmeter of FIG. 1 is designed to be inserted in a pipeline 10 which has had a small section removed or reserved to make room for the meter. The pipeline 10 is equipped with opposing spaced flanges 12 which mate with mounting flanges 14 welded to short sections of pipe 10' connected to a massive central manifold block 16 supporting two parallel planar loops 18 and 20. The configuration of loops 18 and 20 is essentially identical. Thus, the description of the shape of loop 18 holds true for loop 20 as well. Manifold block 16 is preferably a casting in the shape of a solid rectangular block with a flat horizontal upper surface or top 16a and integral pipe sections 10'. The ends of loop 18 comprise straight preferably vertical parallel inlet and outlet sections or legs 22 and 24 securely affixed, e.g., by butt welding, to the top of the manifold 16a in close proximity to each other. The base of loop 18 is a long straight section 26 passing freely through an undercut channel 28 in the bottom face of the casting 16. The long straight section 26 at the base of the loop 18 is connected to the upright legs 22 and 24 by respective diagonal sections 30 and 32. The four junctions between the various straight segments of the loop 18 are rounded by large radii turns to afford as little resistance to flow as possible. In particular, upright legs 22 and 24 are connected to the respective diagonal segments 30 and 32 by means of apex turns 34 and 36 respectively. The ends of the long straight base section 26 are connected to the respective ends of the diagonal segments 30 and 32 by lower rounded turns 38 and 40.

The parallel inlet/outlet ends 22, 24 of both loops 18 and 20 pass through a correspondingly apertured isolation plate or node plate 41 which is parallel to surface 16a and spaced therefrom by a predetermined distance, for example, 0.825 inch in a one-inch pipe embodiment. The node plate serves as a stress isolation bar and defines a common mechanical ground for each loop.

An advantage of the node plate 41 as mechanical ground compared to the casting 16 is that the interconnection of the plate and inlet/outlet legs 22, 24 is by way of completely external circular weldments on the upper and lower surfaces of the plate, forming two external rings around each leg. In contrast, the butt welds of the tube ends to the bosses on the casting 16 are exposed on the interior to the process fluid which will tend in time to corrode the weldments faster if they are in constantly reversing torsional stress.

Figure 2:
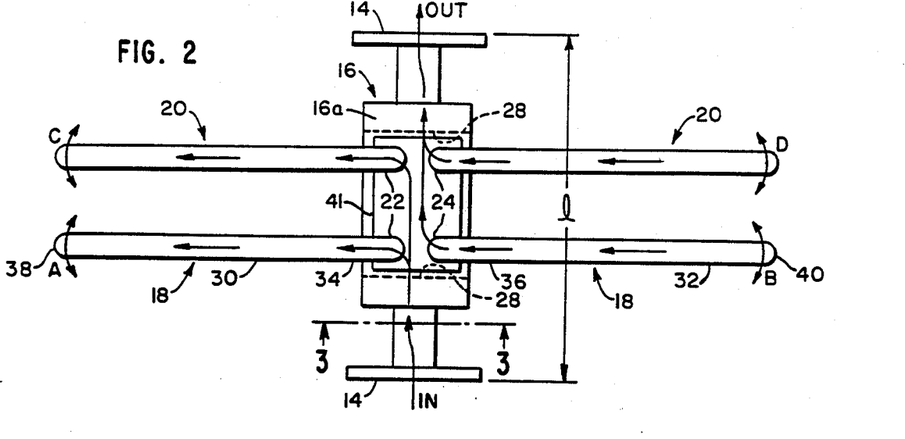
FIG. 2 is a plan schematic view of the flowmeter of FIG. 1 with a parallel flow manifold block.

Manifold casting 16 is channeled inside so that the inlet stream is diverted in parallel to upright legs 22 of loops 18 and 20 as shown in FIG. 2. The loop outlet from upright legs 24 is combined and diverted to the outlet of the meter, back to the pipeline 10. The loops 18 and 20 are thus connected in parallel flow-wise as well as geometry-wise.

Figure 2A:
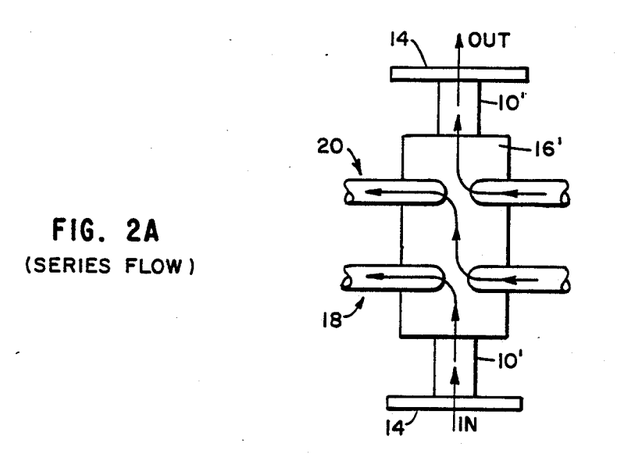
FIG. 2A is a plan schematic fragmentary view like that of FIG. 2 with a series flow manifold block.
Figure 3:
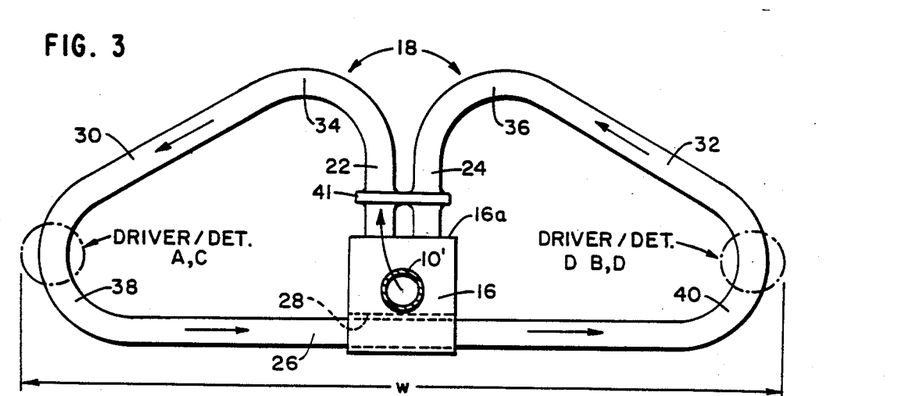
FIG. 3 is a side schematic view in elevation of the apparatus of FIG. 2 taken in the indicated direction along lines 3—3.

FIG. 2A shows a variation in which the channels in manifold block 16' are modified for series flow through the loops. Blocks 16 and 16' are otherwise interchangeable.

Figure 4:
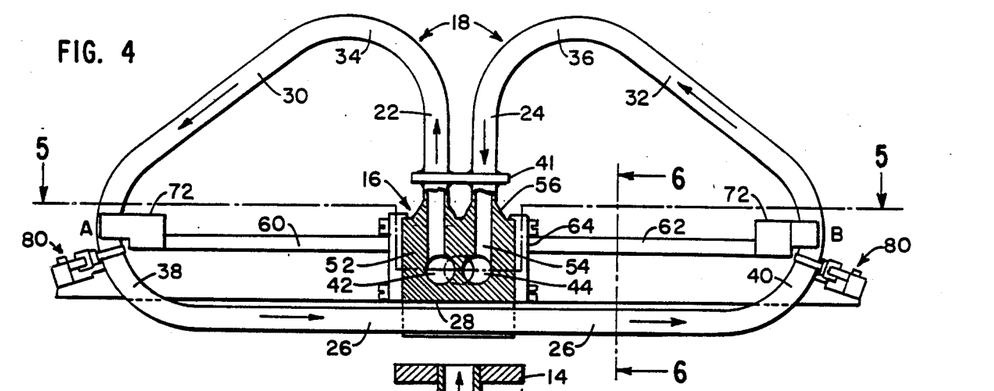
FIG. 4 is a side elevational view of the apparatus of FIG. 1 in more detail with portions of the central manifold assembly broken away to reveal the inlet and outlet chambers.
Figure 5:
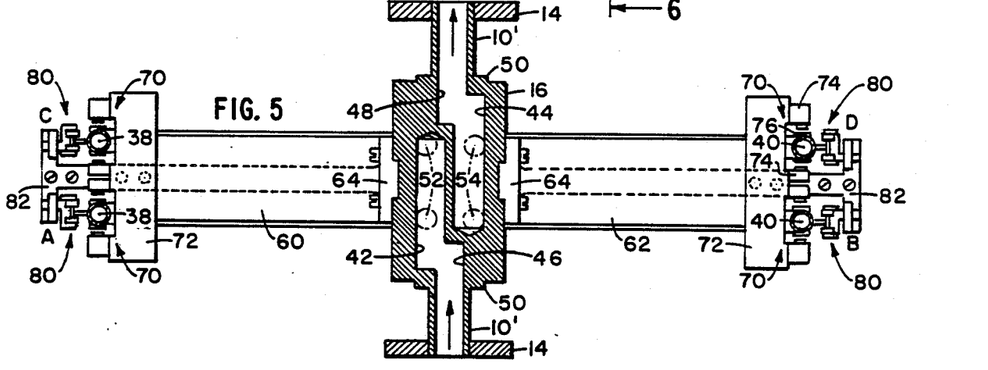
FIG. 5 is a sectional view with portions in plan taken in the direction indicated along the lines 5—5 of FIG. 4.
Figure 6:
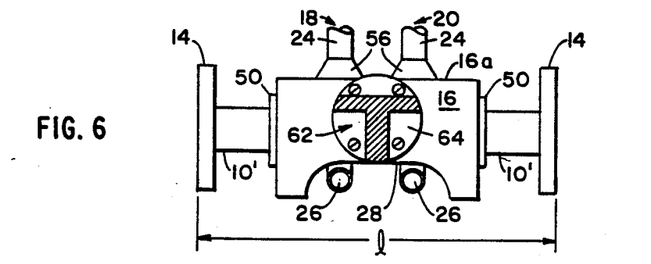
FIG. 6 is a side elevational view of the central manifold assembly with the tubes and support arm in section taken in the direction indicated along the lines 6—6 of FIG. 4.

The manifold casting 16 is shown in FIGS. 4 and 5. A pair of offset overlapping channels 42 and 44, parallel to the process line, are connected to the respective integral inlet and outlet pipe sections 10' by means of larger offset openings 46 and 48. Channels 42 and 44 are in communication respectively with the inlet and outlet of the meter to form intake and exhaust manifolds. A pair of vertical spaced ports 52 through the casting 16 communicate the inlet legs 22 of the loops 18 and 20 with the intake manifold formed by channel 42. Likewise, a pair of vertical spaced ports 54 communicate the upright outlet legs 24 of loops 18 and 20 with the exhaust manifold formed by channel 44. As shown in FIGS. 4 and 6, the ends of the two pairs of upright legs 22 and 24 are butt welded to hollow conical bosses 56 rising integrally from the casting coaxially with respective ports 52 and 54.

The electrical driver/detector assemblies are supported independently on the outboard ends of rigid opposed arms 60 and 62 in the form of T-beams securely attached to opposite faces of the manifold casting 16 by disk shaped mounting flanges 64. Flanges 64 and casting 16 may be matingly keyed as shown in FIG. 5 for extra stability. Cantilevered arms 60 and 62 extend parallel within the planes of the two loops 18 and 20 and the vertical plates of the arms pass between the corners 38 and 40 where the driver/detector assemblies are located for both loops.

At the end of the upper deck of each cantilevered arm 60, 62, two identical solenoid type driver assemblies 70 are located and held in position by driver brackets 72. Each driver comprises a pair of solenoid coils and pole pieces 74 which act on ferromagnetic slugs 76 welded onto opposite sides of the lower turn 38, 40. Thus, there are eight independent drivers, one pair for each end of each loop 18, 20. Each driver imparts reciprocal sideways motion to the tube between the slugs 76.

By energizing the driver pairs on opposite ends of the same tube with current of equal magnitude but opposite sign (180° out of phase), straight section 26 is caused to rotate about its coplanar perpendicular bisector 79 which intersects the tube at point c as shown in FIG. 1. The drive rotation is thus preferably in a horizontal plane about point c. The perpendicular bisectors for the straight sections of both loops preferably lie in a common plane of symmetry for both loops as noted in FIG. 1.

Repeatedly reversing (e.g., controlling sinusoidally) the energizing current of the complementary drives 70 causes the straight section 26 of the loop 18 to execute an oscillatory motion about point c in the horizontal plane. The motion of each straight section 26 sweeps out a bow tie shape. The entire lateral excursion of the loop at the corners 38 and 40 is small, on the order of $\frac{1}{8}$ of an inch for a two foot long straight section 26 for a one inch pipe. This displacement is coupled to the upright parallel legs 22 and 24 as torsional deflection about the axes of the legs 22 and 24 beginning at the node plate 41. The same type of oscillatory motion is induced in the straight section of the loop 20 by the other respective pair of complementary drives 70 supported on the outer ends of the upper deck of the cantilevered arms 60 and 62, respectively.

The central vertical portion of the T-beam extends between the corners 38 and 40 of the two loops 18 and 20, respectively, and supports detector assemblies 80 on brackets 82 at the respective ends of the arms 60 and 62. Each of the four detector assemblies 80 includes a position, velocity or acceleration sensor, for example, a variable differential transformer having a pair of coils mounted on the stationary bracket 82 and a movable element between the coils affixed to the tube corner 38, 40. The movable element is connected to a strap welded to the corner 38, 40 of the loop as shown. Conventional optical, capacitive or linear variable displacement transducers (LVDT's) may be substituted. It is desirable for the position detector to have an output that is linear with respect to displacement over the limited deflection range and relatively insensitive to motions substantially skewed with respect to the plane of the respective loop. However, the implementation of the detector is a matter of design choice and does not form a part of the present invention.

The driver detector assembly pairs 70, 80 for loop 18 are designated A and B corresponding to the opposite ends of the straight section 26 of loop 18. Likewise, the driver/detector assemblies for the other parallel loop 20 are designated C and D for the left and right ends as viewed in the drawing.

Figure 7:
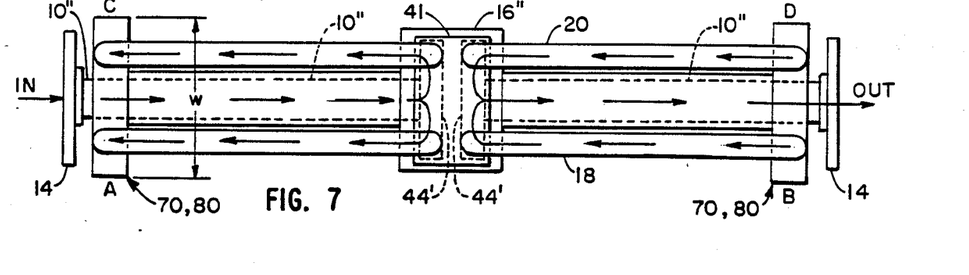
FIG. 7 is a plan view of an in-line embodiment of a double loop, dual drive Coriolis effect mass flowmeter, according to the invention, in which the planes of the loops are oriented parallel to the process line.
Figure 8:
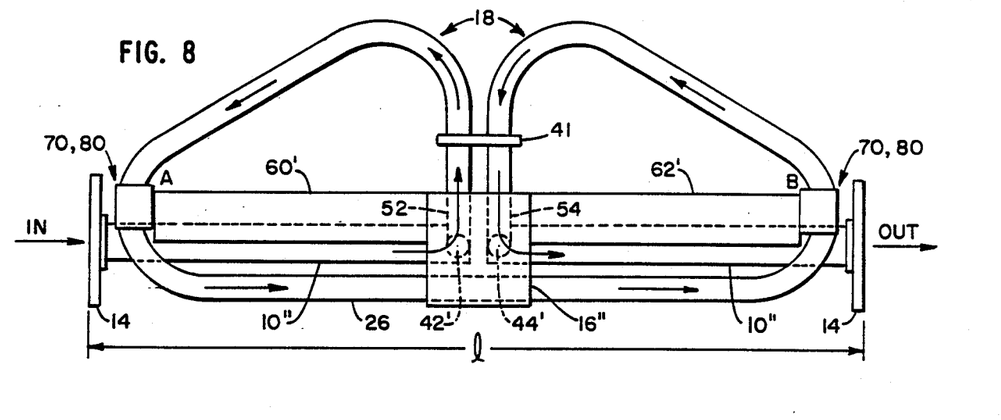
FIG. 8 is a side elevational view of the apparatus of FIG. 7.

An alternate embodiment of the same parallel loop configuration shifted 90° is shown in FIGS. 7 and 8. Here, the planes of the loops 18 and 20 are arranged parallel to the process flow direction. In-line pipe section 10" connecting the mounting flange to the somewhat abbreviated manifold casting 16 is extended (or connected to another pipe segment) to traverse the entire length of one side of the loops 18 and 20. The motion of the loops and location of the node plate and driver/detector assemblies are identical to those in the perpendicular embodiment of FIG. 1. In the in-line embodiment of FIGS. 7 and 8, however, the driver/detector assembly arms 60' and 62' may, if desired, be supported over their entire length by the respective pipe section 10". The parallel flow paths among the loops 18 and 20 in Figs. 7 and 8 are identical to those in the embodiment of FIG. 1. The channeling of the manifold casting 16" is somewhat different in that the manifolds 42' and 44' are perpendicular to the coaxial inlet/outlet lines.

Figure 9:
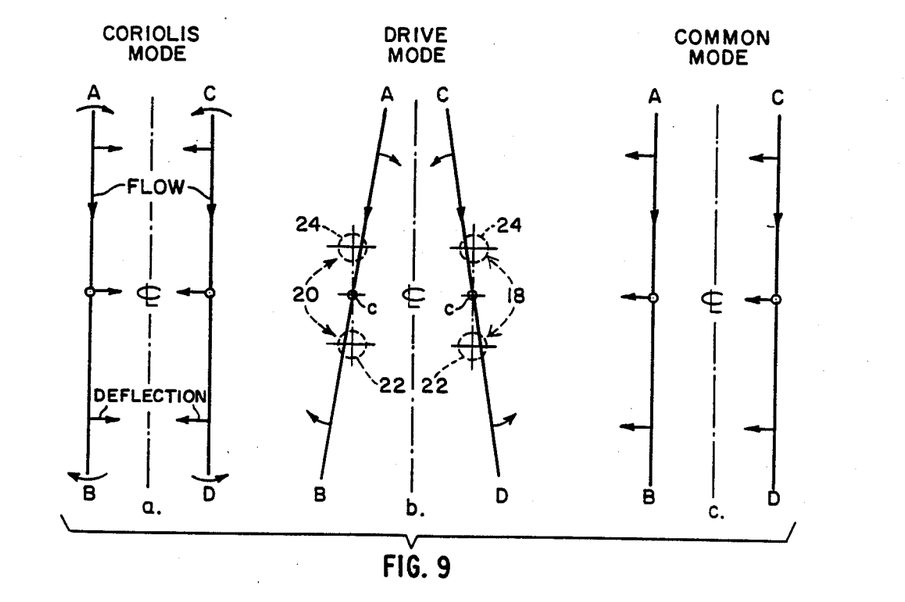
FIG. 9 is a schematic representation of three modes of motion of the apparatus of FIGS. 1 and 7.

The motion of the straight sections 26 of loops 18 and 20 for either perpendicular or in-line embodiments is shown in three modes a, b and c in FIG. 9. Drive mode b is oscillatory about point c with the two loops rotating synchronously but in the opposite sense, i.e., while loop 18 rotates clockwise, loop 20 is undergoing counterclockwise rotation. Consequently, respective ends such as A and C as shown in FIG. 9 periodically come together and go apart. This type of drive motion induces coriolis effects in opposite directions as shown in a of FIG. 9. Coriolis mode motion thus tends to pivot the whole planes of the loops 18 and 20 respectively but in the opposite direction. The Coriolis effect is greatest when the two straight sections 26 are parallel as shown in a of FIG. 9 because the sinusoidally varying angular velocity is then at its maximum. Because the coriolis mode motion of each loop is in the opposite direction, the straight sections 26 move slightly toward (or away) from each other as shown in a of FIG. 9. A common mode motion, undesirable in this instrument, would be one which deflected the loops in the same direction as shown in c of FIG. 9. This type of motion might be produced by an axial wave in the pipeline itself in the embodiment of FIG. 1 because the loops are oriented perpendicular to the pipeline. The in-line embodiment of FIGS. 7 and 8 might be less vulnerable to this type of extraneous vibration.

The resonant frequency of the Coriolis motion and common mode motion should be determined by design configuration to be different from the resonant frequency of the oscillatory motion of the straight section, i.e., the drive mode.

Figure 10A:
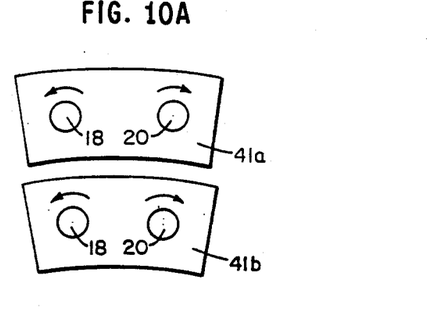
FIGS. 10A and 10B are contrasting schematic representations of dual and single node plates respectively undergoing exaggerated torsional in-plane deflection.
Figure 10B:
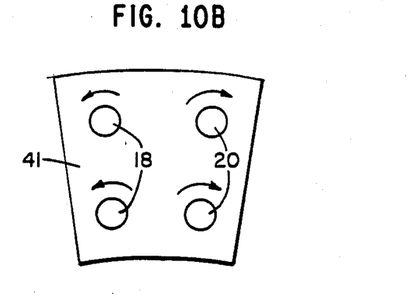

The further the displacement of the node plate 41 in FIG. 1 from the casting 16, the higher the resonant frequency of the loop in the drive mode. However, the node plate also tends to reduce the Coriolis effect displacement, the farther the plate is spaced from the casting 16. Two node plates 41a and 41b can be employed linking corresponding ends of the loops as shown in FIG. 10A. Using one plate, however, as shown in FIG. 1 and 10B, may provide better isolation. In either case as the distance of the node plate or plates from the manifold increases, the meter becomes less sensitive to Coriolis mode and requires more drive force for the same tube configuration.

Figure 11A:
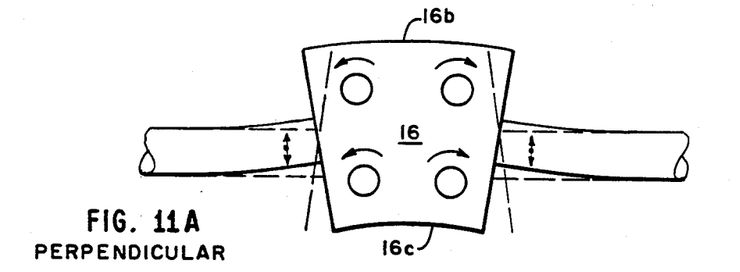
FIGS. 11A and 11B are contrasting schematic representations of the effect of exaggerated torsional deflection on the pipeline connected to the casting 16 in the perpendicular and in-line embodiments, respectively.
Figure 11B:
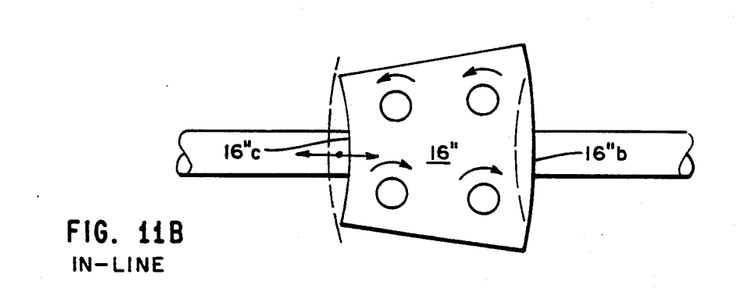

The in-line version of FIG. 7 and 8 has a possible advantage over the perpendicular model of FIG. 1 which is illustrated in Figs. 11A and 11B. In the meter with the loops perpendicular to the process line, the torsional stress on the casting 16 tends to distort the casting slightly by placing face 16b in tension and face 16c in compression skewing the faces to which the process line is connected. While the manifold casting 16 bends less than the node plate or plates shown in FIG. 10A and 10B, a slight transverse oscillation of the pipeline from side to side could arise as illustrated in FIG. 11A. The in-line design may be less susceptible since the pipeline is connected to faces 16b and 16c which deflect more in parallel than the other two faces, as illustrated in FIG. 11B. Of course, the magnitude of the torsional stress of the casting in either case is reduced by employing a node plate or plates.

Figure 12:
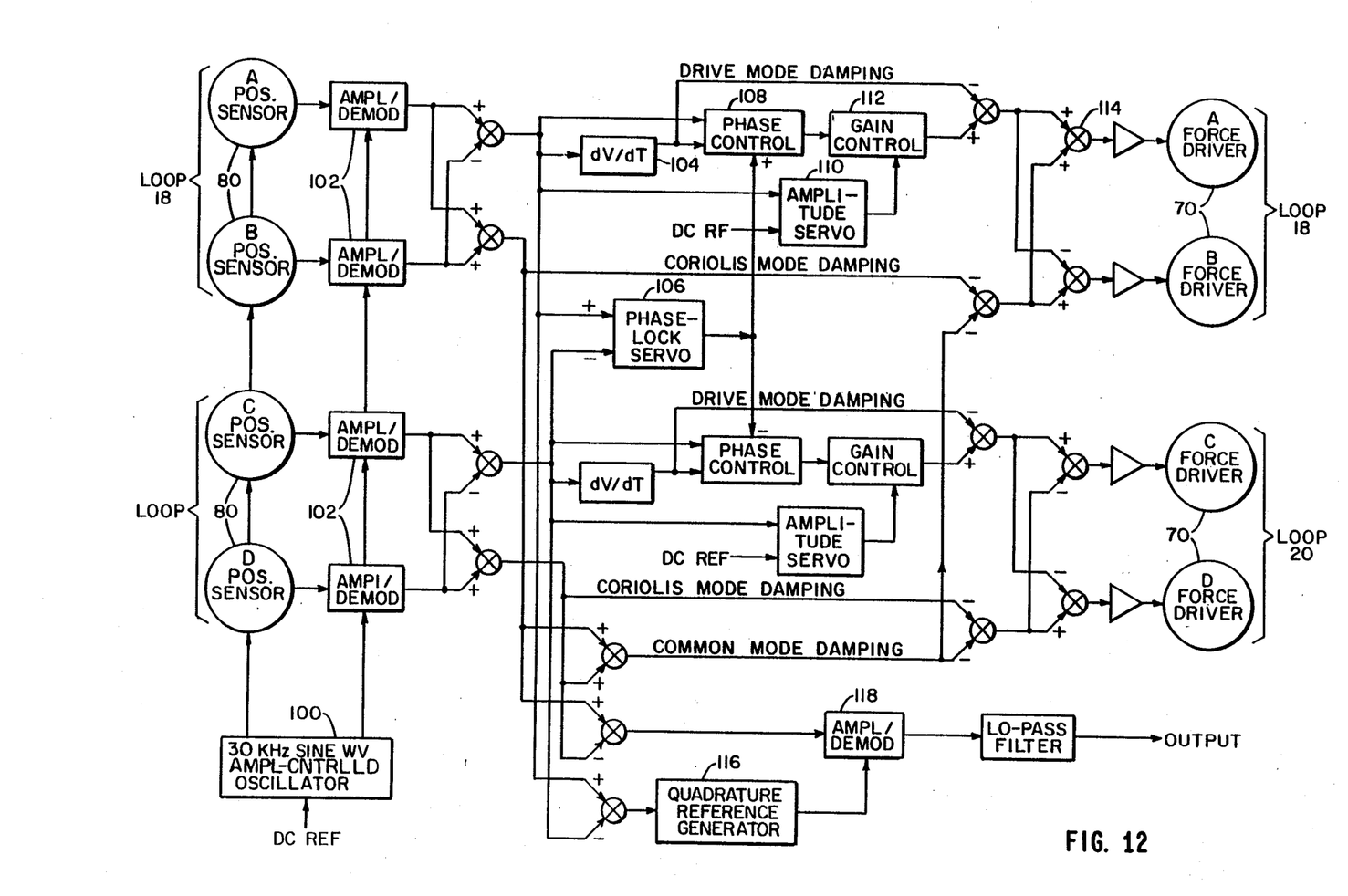
FIG. 12 is a functional block diagram of the electrical circuitry for the drivers and detectors associated with the perpendicular and in-line, embodiments of FIG. 1 and FIG. 7.

As shown in FIG. 12, the sensing and control scheme employs dual sensors and dual drivers corresponding to the ends of each loop. For loop 18, positions A and B at the lower corners 38 and 40 are occupied by respective sensors and drivers Likewise, positions C and D at the ends of the lower straight section of loop 20 are occupied by corresponding sensors and drivers. The four position sensors, preferably variable differential transformers, are excited by a 30 kHz sine wave from oscillator 100. The outputs of the transformer coils are demodulated by respective amplitude demodulators 102 and fed to sum and difference circuits as shown. At this point, the output voltage of sensor A will be of the form:

$$V_A = A_D \sin \omega t + A_C \cos \omega t$$

The output of the B sensor will be of the form:

$$V_B = -A_D \sin \omega t + A_C \cos \omega t$$

The sine term represents the drive mode motion and the cosine term 90° out of phase with the sine term, represents the Coriolis mode motion. The difference of these voltage signals (DRV1) doubles the drive signal and cancels the Coriolis term. The sum of these voltage signals (COR1) doubles the Coriolis term and cancels the drive signal. The derivative of the drive term DRV1 out of differentiator 104 transforms the signal to the cosine which is used as the drive signal. A similar sine drive mode term (DRV2) is derived from loop 20's position sensors C and D and compared, if necessary, with the drive mode term from loop 18 in phase lock servo 106. The error signal from circuit 106 is used in phase control block 108 as a control signal to rotate the phase if necessary by adding back a little of the sine component to the derivative term. The drive mode term (sine) DRV1 is compared with a DC reference by an amplitude servo 110 and fed to gain control amplifier 112 to adjust the amplitude of the drive signal to the driver 70 to maintain average amplitude of the drive output term constant Instead of an amplitude servo 110, the amplitude of the sine drive mode term can be allowed to vary and simply be monitored and ratioed in the output of the drive circuit.

The phase and gain adjusted signal is compared to the drive mode damping signal from the differentiator 104 and fed via summer 114 and an amplifier to force driver A on loop 18. Summer 114 adds in a Coriolis mode term and a common mode damping term if necessary. Coriolis mode damping uses the cosine term COR1 or COR2 to drive in the Coriolis mode in opposite direction at the Coriolis mode resonant frequency in response to a spurious increase in Coriolis mode motion due, for example, to centrifugal acceleration of the flow.

Common mode damping is provided by summing the reverse Coriolis terms COR1 and COR2 from the respective loops to see if they are other than in the opposite direction, i.e., if they are not equal and opposite This term is added to the Coriolis term before compensating the drive signal in summer 114.

The B force driver signal is derived in exactly the same way except that the drive mode signal is reversed. The drive signals for drivers C and D on loop 20 are similarly derived in a corresponding manner.

The output signal designed to track Coriolis mode motion is derived by summing the magnitude of the Coriolis terms and using the 90° out of phase drive mode motion signals to produce a quadrature reference 116 which is used in a synchronous demodulator 118 which compares the Coriolis terms to the phase of the drive signal The output of the demodulator 118 is passed via a low pass filter to remove noise. The synchronous demodulation step purifies the Coriolis term by removing components in phase with the drive signal.

While common mode damping and phase locking between the two loops may be necessary with some configurations within the scope of the invention or with some applications, these coupling features have not been found to be necessary in prototypes of the embodiment of FIG. 1. This is because the common mode motion and phase difference between the two loops has been found to be negligible in practice.

Figure 13:
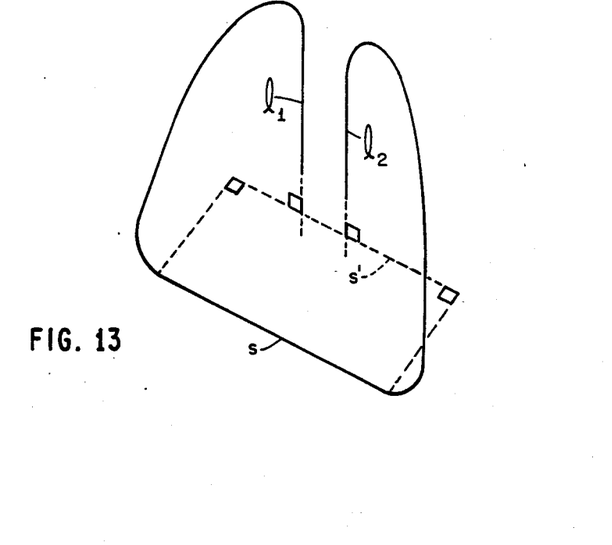
FIGS. 13 and 14 are schematic perspective and plan representations of alternate loop configurations, respectively.

The general configuration of the loop or loops is not restricted to the "coat hanger" design of the detailed embodiment. Other configurations besides the "coat hanger" can be designed to embody the principle of an oscillating straight section with ends connected via side sections or lobes to respective parallel inlet/outlet legs $l_1$ and $l_2$ which are approximately perpendicular to the orthogonal projection s' of the straight section s in the plane of the legs as illustrated in FIG. 13. The coat hanger design is considered to be a special case of the design principle of FIG. 13.

Figure 14:
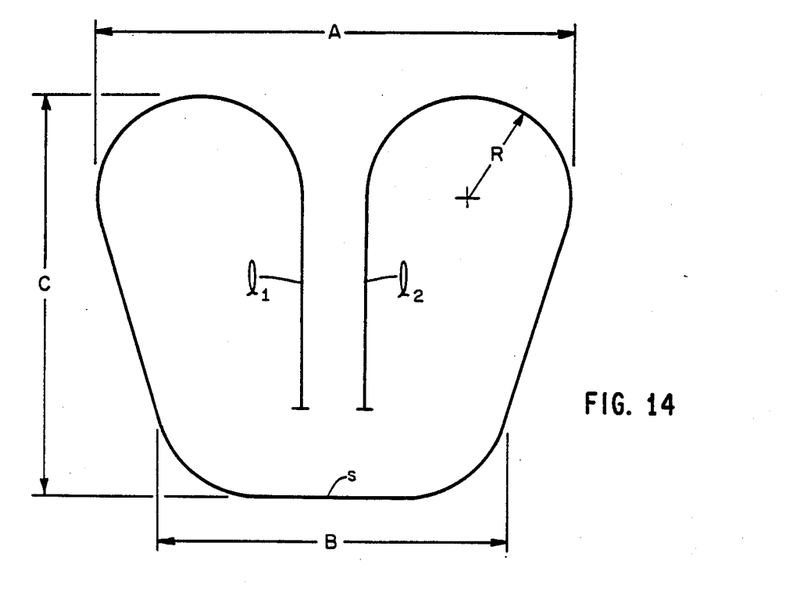

FIG. 14 shows another substantially planar loop design embodying this principle. The parameters of width A, straight section length B, height C and radius R can be varied to achieve different operating characteristics.

The advantages of the invention and foregoing embodiments are numerous. In particular, the independently controlled dual drive system for each loop eliminates imbalances and deflections along the length of the straight section 26 which could be caused by a single oscillatory drive on the axis 80 and permits separate control of both ends to perfect the motion. Having the detectors right at the drivers insures that the system drives and senses the correct mode. The overall symmetry of the configuration adds to its stability. The rigid central manifold acts with the node plate as mechanical ground while the two pairs of straight legs 22, 24 in complementary torsion exhibit a tuning fork effect in combination with the rigid block to reduce vibration of the block itself. Because of the orthogonal orientation of the loops, the axial pipeline length consumed by the meter of FIG. 1-6 is minimized as shown by length 1 in FIG. 2. In the alternate configuration of FIG. 7 and 8, while the length 1' consumed along the pipeline is far greater, the extension of the meter, i.e., the transverse width w' as shown in FIG. 7 is greatly reduced The in-line embodiment of FIGS. 7 and 8 may also tend to eliminate zero offset better than the perpendicular version, i.e., when the flow is stopped.

The oscillation of the straight section 26 exhibits a total linear displacement at each end far less than the diameter of the pipe segment. In fact, in successful prototypes, the excursion has been approximately on the order of 10% of the diameter of the pipe.

The foregoing embodiments are intended to be illustrative and not restrictive. For example, the loop orientation can be rotated 90° so that the long straight section 26 is vertical if desired. In fact many other orientations of the loop are possible without necessarily affecting the operation of the meter. While the symmetry of the device can be changed, it is desirable since it allows reversal of components without affecting the operation of the instrument. Without affecting the overall design the meter can be produced in parallel flow loops as shown in the drawings or in series flow for low flow rates by simply stocking parallel and series manifolds. Moreover, arms 60 and 62 are not essential; the detector and drive assemblies can be mounted directly to the loops themselves although the meter might be more susceptible to common mode motion. The push/pull type drive units referred to herein and also not necessarily required as other suitable means of imparting oscillatory motion may be found to be satisfactory.

Many other modifications, additions and/or subtractions from the illustrated embodiments may be made without departing from the spirit or scope of the invention, which is indicated by the appended claims and equivalents thereto.

What is claimed is:

1. A dual drive Coriolis-type mass flowmeter, comprising
   a support,
   a continuous loop of conduit solidly mounted at its inlet and outlet ends to the support,
   a pair of drive means acting on said loop at different respective points along the loop for oscillating said loop about an oscillation axis, the portion of said loop between said pair of drive means being a substantially straight section,
   a coaxial inlet and outlet, said straight section being perpendicular to the inlet/outlet axis, and
   means for measuring the magnitude of Coriolis forces, arising as a result of mass flow in the portion of said conduit undergoing oscillatory motion.

2. A Coriolis-type mass flowmeter, comprising
   a single rigid manifold block,
   two substantially identical conduit loops, each substantially encircling said block and each having its inlet and outlet ends solidly mounted to said block in juxtaposition with each other and with the ends of the other loop,
   said loops having parallel straight sections,
   drive means for oscillating said straight sections about their parallel perpendicular bisectors respectively, and
   means for measuring the magnitude of Coriolis forces, arising as a result of mass flow in each straight section while undergoing oscillatory motion.

3. The flowmeter of claim 2, further comprising
   a coaxial inlet and outlet of the flowmeter defined in said block,
   said straight sections being perpendicular to the inlet/outlet axis.

4. The flowmeter of claim 2, further comprising
   a coaxial inlet and outlet of the flowmeter defined in said block,
   said straight sections being parallel to the inlet/outlet axis.

5. The flowmeter of claim 2, wherein the ends of said loops mounted to said block are all parallel and perpendicular to said straight sections.

6. The flowmeter of claim 2, wherein said manifold block has an inlet and an outlet for the flowmeter, said manifold having internal channel means communicating the flowmeter inlet with corresponding inlet ends of the respective loops and communicating the flowmeter outlet with the corresponding outlet ends of the respective loops.

7. The flowmeter of claim 2, wherein said manifold block has an inlet and outlet for the flowmeter, said manifold having internal channel means communicating the flowmeter inlet with the inlet end of one of said loops and communicating the outlet end of the one loop with the inlet end of the other loop and communicating the outlet end of the other loop with the outlet of the flowmeter for series flow through said loops.

8. A Coriolis-type mass flowmeter system, comprising
two substantially identical conduit loops with juxtaposed ends,
a series flow rigid manifold block having a flowmeter inlet, a flowmeter outlet and four juxtaposed ports for connection to the loop ends, said series block having internal channel means for communicating the flowmeter inlet with the inlet end of one of said loops, and communicating the outlet end of the one loop with the inlet end of the other loop and communicating the outlet end of the other loop with the flowmeter outlet for series flow through said loops,
a parallel flow rigid manifold block having a flowmeter inlet, a flowmeter outlet and four juxtaposed ports for connection to the loop ends, said parallel block having internal channel means for communicating its flowmeter inlet with the inlet ends of both loops and communicating the outlet ends of both loops with the flowmeter outlet for parallel flow through said loops,
means for oscillating corresponding sections of said loops, and
means for measuring the magnitude of Coriolis forces arising as a result of mass flow in each section while undergoing oscillatory motion,
said blocks being interchangeable to realize series or parallel flow in the loops of the flowmeter.

9. The system of claim 8, wherein said loop sections are parallel straight sections and said oscillating means includes means for oscillating said straight sections about their parallel perpendicular bisectors.

10. The system of claim 8, wherein each said loop substantially encircles its ends.

11. The system of claim 9, wherein the loop ends are all parallel and perpendicular to said straight sections.

12. A Coriolis-type mass flowmeter, comprising
a support,
a continuous conduit loop substantially encircling said support having two juxtaposed ends solidly mounted to said support,
drive means for oscillating a section of said loop about an axis midway between the ends of said section, and
means for measuring the magnitude of Coriolis forces, arising as a result of mass flow in the section of conduit while undergoing oscillatory motion.

13. The flowmeter of claim 12, wherein said section is a straight section and said support is a rigid internally channeled body, the ends of said loop being parallel and perpendicular to said straight section,
whereby the oscillatory motion of said straight section is accommodated by torsional stress of said end sections.

14. The flowmeter of claim 13, wherein a portion of said body is cut away to form a channel through which said straight section freely passes.

15. The flowmeter of claim 14, further comprising
a second loop of substantially identical shape to said first loop, said loops lying nominally in respective parallel planes, the ends of the second loop being solidly mounted to the same block as said first loop.

16. The flowmeter of claim 12, further comprising
a pair of opposed cantilevered arms rigidly connected to said support,
said drive means including a pair of drive means mounted on the ends of said respective cantilevered arms adjacent the respective ends of the straight section of said loop.

17. The flowmeter of claim 16, wherein said measuring means includes a pair of sensors located respectively on opposite ends of the same cantilevered arms carrying said drive means.

18. A Coriolis-type mass flowmeter, comprising
a support,
a conduit loop substantially encircling said support having a straight section and parallel inlet and outlet end sections perpendicular to the orthogonal projection of said straight section onto the plane defined by said inlet/outlet sections, the end sections being solidly mounted to said support,
drive means for oscillating said straight section about an orthogonal axis passing through a point between the ends of said straight section, and
means for measuring the magnitude of Coriolis forces arising as a result of mass flow in the straight section while undergoing oscillatory motion.

19. A Coriolis-type mass flowmeter, comprising
single rigid manifold block having a coaxial inlet and outlet of the flowmeter,
first and second conduit loops having parallel straight sections, the ends of each loop being parallel to each other and perpendicular to said straight section and solidly mounted to said block close to each other,
channel means in said manifold block for communicating the inlet thereof with at least one of the inlet ends of said respective loops and for communicating the outlet of the manifold block with at least one of the outlet ends of the respective loops for series or parallel flow,
a pair of drive means associated with each loop located approximately at the ends of the respective straight section for oscillating said straight section about its perpendicular bisector,
sensor means juxtaposed with each pair of drive means for sensing the deflection of said straight section out of the nominal plane of said loop,
control means responsive to the outputs of said position sensors on a given loop for controlling said drive means on the same loop, and
means responsive to the output of the position sensors on both loops for measuring the combined magnitude of the Coriolis forces, arising as a result of mass flow in the straight sections of the conduit loops while undergoing oscillatory motion.

20. The flowmeter of claim 19, including a pair of common support means, respective pairs of drive means and corresponding position sensors being supported by respective ones of said support means.

21. The flowmeter of claim 20, wherein said support means are opposed arms cantilevered from said manifold block.

22. The flowmeter of claim 19, wherein the straight section of said loops are transverse to the inlet/outlet axis of said manifold block.

23. The flowmeter of claim 19, wherein the straight sections of said loops are parallel to the inlet/outlet axis of said manifold block.

24. A signal processing and control method for a Coriolis-type mass flowmeter having at least one oscillating conduit, comprising oscillating a section of the conduit about an axis midway between the ends of said section, detecting the motions of the respective ends of said section and producing two complementary sensor outputs corresponding to said respective ends of said section, each sensor output including a drive component mixed with a Coriolis component, recovering the Coriolis component without the drive component from said two sensor outputs, recovering the drive component from said two sensor outputs and generating a reference signal for synchronous demodulation of the recovered Coriolis component, 90° out-of-phase with the recovered drive component, controlling the oscillation of each conduit section with a drive signal derive from said recovered drive component by developing a drive signal corresponding to the first derivative of said recovered drive component, and synchronously demodulating a signal representing the recovered Coriolis component with a reference signal in quadrature with the drive component to produce an output signal indicative of mass flow.

25. A signal processing and control method for a Coriolis-type mass flowmeter having at least one oscillating conduit, comprising oscillating a section of the conduit about an axis midway between the ends of said section, detecting the motions of the respective ends of said section and producing two complementary sensor outputs corresponding to said respective ends of said section, each sensor output including a drive component mixed with a Coriolis component, recovering the drive component without the Coriolis component from said two sensor outputs, controlling the oscillation of each conduit in accordance with a drive signal derived from the recovered drive component, said drive signal corresponding to the first derivative of said recovered drive component.

26. In a Coriolis-type mass flowmeter having at least one oscillating conduit, the combination comprising an oscillation drive system coupled to the conduit to oscillate a section thereof about an axis midway between the ends of said section, a detector system arranged to sense the motions of the respective ends of said section producing complementary sensor outputs corresponding to said respective ends of said section, each including a drive component mixed with a Coriolis component, a signal processing circuit connected to receive said sensor outputs for recovering the Coriolis component therefrom without the drive component, a detection circuit connected to receive said recovered Coriolis component from said signal processing circuit and having an output signal indicative of mass flow, said detection circuit including a synchronous demodulator connected to receive the recovered Coriolis component and a reference signal in quadrature with the drive component and having an output signal indicative of mass flow.

27. The apparatus of claim 26, wherein said signal processing circuit recovers the drive component from said two sensor outputs, and further comprising a quadrature reference generator connected to receive the recovered drive component and having an output quadrature reference signal 90° out-of-phase therewith.

28. The apparatus of claim 27, further comprising a differentiator having an input connected to receive the recovered drive component and an output forming the drive signal input to said oscillation drive system.

29. The apparatus of claim 28, further comprising a drive signal generator responsive to the output of said differentiator producing a drive signal output to said oscillation drive system, and a variable gain control circuit between said differentiator and said drive signal generator.

30. The apparatus of claim 28, wherein said oscillation drive system includes a driver coupled to each end of each conduit section, complementary forms of said drive signal being applied to said force drivers at opposite ends of each conduit section.

31. In a Coriolis-type mass flowmeter having at least one oscillating conduit, the combination comprising an oscillation drive system coupled to the conduit to oscillate a section thereof about an axis midway between the ends of said section, a detector system arranged to sense the motions of the respective ends of said section producing complementary sensor outputs corresponding to said respective ends of said section, each including a drive component mixed with a Coriolis component, a signal processing circuit connected to receive said sensor outputs for recovering the drive component therefrom without the Coriolis component, a derivative circuit having an input connected to receive the drive component and an output forming a drive signal input to said oscillation drive system, said derivation circuit including a differentiator.

32. The apparatus of claim 31, wherein said derivation circuit includes a variable amplitude control circuit.

33. In a Coriolis-type mass flowmeter having at least one oscillating conduit, the combination comprising an oscillation drive system coupled to the conduit to oscillate a section thereof about an axis midway between the ends of said section, a detector system arranged to sense the motions of the respective ends of said section producing complementary sensor outputs corresponding to said respective ends of said section, each including a drive component mixed with a Coriolis component, a signal processing circuit connected to receive said sensor outputs for recovering the Coriolis component therefrom without the drive component and for recovering the drive component therefrom without the Coriolis component, a reference generator responsive to the recovered drive component having at least one output forming a reference signal with a predetermined phase relationship thereto, and at least one synchronous demodulator having a signal input connected to receive the recovered Coriolis component and a reference input connect to receive said reference signal and an output indicative of a detected parameter.

34. A signal processing and control method for a Coriolis-type mass flowmeter having at least one oscillating conduit, comprising oscillating a first conduit section about an axis midway between the ends of said first section, oscillating a second conduit section about an axis midway between the ends of said second section in synchronism with said first section, detecting the motions of the respective ends of said first section and producing two complementary sensor outputs corresponding to said respective ends of said first section, detecting the motions of the respective ends of said second section and producing two other complementary sensor outputs corresponding to said respective ends of said second section, each sensor output including a drive component mixed with a Coriolis component, recovering the Coriolis component without the drive component from both pairs of sensor outputs, recovering the drive component from said sensor outputs and generating a reference signal for synchronous demodulation of the recovered Coriolis component, 90° out-of-phase with the recovered drive component, controlling the oscillation of each conduit section with a drive signal derived from said recovered drive component by developing a drive signal corresponding to the first derivative of said recovered drive component, and synchronously demodulating a signal representing the recovered Coriolis component with a reference signal in quadrature with the drive component to produce an output signal indicative of mass flow.

35. A signal processing and control method for a Coriolis-type mass flowmeter having at least one oscillating conduit, comprising oscillating first conduit section about an axis midway between the ends of said section, oscillating second conduit section about an axis midway between the ends of said second section in synchronism with said first section, detecting the motions of the respective ends of said first section and producing two complementary sensor outputs corresponding to said respective ends of said first section, detecting the motions of the respective ends of said second section and producing two other complementary sensor outputs corresponding to said respective ends of said second section, each sensor output including a drive component mixed with a Coriolis component, recovering the drive component without the Coriolis component from both pairs of sensor outputs, controlling the oscillation of each conduit in accordance with a drive signal derived from the recovered drive component, said drive signal corresponding to the first derivative of said recovered drive component.

36. In a Coriolis-type mass flowmeter having at least one oscillating conduit, the combination comprising another conduit, an oscillation drive system coupled to the conduit to oscillate a section thereof about an axis midway between the ends of said section, said oscillation drive system also being coupled to said other conduit to oscillate a section thereof about an axis midway between the ends of said section in synchronism with the section of said one conduit, a detector system arranged to sense the motions of the respective ends of said section of said one conduit producing complementary sensor outputs corresponding to said respective ends of said section of said one conduit, said detector system further arranged to sense the motions of the respective ends of said section of said other conduit producing complementary sensor outputs corresponding to said respective ends of said section of said other conduit, including a drive component mixed with a Coriolis component, a signal processing circuit connected to receive said sensor outputs for recovering the Coriolis component therefrom without the drive component, and a detection circuit connected to receive said recovered Coriolis component from said signal processing circuit and having an output signal indicative of mass flow, said detection circuit including a synchronous demodulator connected to receive the recovered Coriolis component and a reference signal in quadrature with the drive component and having an output signal indicative of mass flow.

37. In a Coriolis-type mass flowmeter having at least one oscillatory conduit, the combination comprising another conduit, an oscillation drive system coupled to the conduit to oscillate a section thereof about an axis midway between the ends of said section, said oscillation drive system also being coupled to said other conduit to oscillate a section thereof about an axis midway between the ends of said section in synchronism with the section of said one conduit, a detector system arranged to sense the motions of the respective ends of said section of said one conduit producing complementary sensor outputs corresponding to said respective ends of said section of said one conduit, said detector system further arranged to sense the motions of the respective ends of said section of said other conduit producing complementary sensor outputs corresponding to said respective ends of said section of said other conduit, including a drive component mixed with a Coriolis component, a signal processing circuit connected to receive said sensor outputs for recovering the drive component therefrom without the Coriolis component, and a derivation circuit having an input connected to receive the drive component and an output forming a drive signal input to said oscillation drive system, said derivation circuit including a differentiator.

38. In a Coriolis-type mass flowmeter having at least one oscillating conduit, the combination comprising another conduit, an oscillation drive system coupled to the conduit to oscillate a section thereof about an axis midway between the ends of said section, said oscillation drive system also being coupled to said other conduit to oscillate a section thereof about an axis midway between the ends of said section in synchronism with the section of said one conduit, a detector system arranged to sense the motions of the respective ends of said section of said one conduit producing complementary sensor outputs corresponding to said respective ends of said section of said one conduit, said detector system further arranged to sense the motions of the respective ends of said section of said other conduit producing complementary sensor outputs corresponding to said respective ends of said section of said other circuit, including a drive component mixed with a Coriolis component, a reference generator responsive to the recovered drive component having at least one output forming a reference signal with a predetermined phase relationship thereto, and
at least one synchronous demodulator having a signal input connected to receive the recovered Coriolis component and a reference input connect to receive said reference signal and an output indicative of a detected parameter.

* * * * *

UNITED STATES PATENT AND TRADEMARK OFFICE
CERTIFICATE OF CORRECTION

PATENT NO. : 4,891,991
DATED : January 9, 1990
INVENTOR(S) : Wade M. Mattar et al.

It is certified that error appears in the above-identified patent and that said Letters Patent is hereby corrected as shown below:

```
Column 1, line 38, "Coriolis effect" should be
                   --Coriolis effect--.
Column 4, line 14, "in-line," should be --in-line--.
Column 8, line 1,  "drivers" should be --drivers.--.
Column 8, line 38, "constant" should be --constant.--.
Column 8, line 68, "signal" should be --signal.--.
Column 9, line 18, the number 1 in "1₁ and 1₂" should be
                   the letter l.
Column 9, line 43, the number 1 in "length 1" should be
                   the letter l.
Column 9, line 45, the number 1 in "1'" should be the letter l.
Column 9, line 47, "reduced" should be --reduced.--.
Column 12, line 24, "single" should be --a single--.
Column 13, line 16, "derive" should be --derived--.
Column 14, line 31, "derivative" should be --derivation--.
Column 16, line 18, "oscillatory" should be --oscillating--.
```

Signed and Sealed this

Tenth Day of March, 1992

Attest:

HARRY F. MANBECK, JR.

Attesting Officer

Commissioner of Patents and Trademarks